US006102755A

United States Patent [19]
Hoshiba

[11] Patent Number: 6,102,755
[45] Date of Patent: Aug. 15, 2000

[54] ENGINE TRANSMISSION CONTROL FOR MARINE PROPULSION

[75] Inventor: Akihiko Hoshiba, Hamamatsu, Japan

[73] Assignee: Sanshin Kogyo Kabushiki Kaisha, Hamamatsu, Japan

[21] Appl. No.: 09/114,562

[22] Filed: Jul. 13, 1998

[30] Foreign Application Priority Data

Jul. 11, 1997 [JP] Japan .................................... 9-186403

[51] Int. Cl.[7] .................................................... B60K 41/04

[52] U.S. Cl. .................................. 440/1; 440/86; 440/87

[58] Field of Search .................................. 440/1, 84, 86, 440/87, 75; 477/110, 107

[56] References Cited

U.S. PATENT DOCUMENTS

| | | | |
|---|---|---|---|
| 2,867,132 | 1/1959 | Schroeder | 440/86 |
| 3,669,234 | 6/1972 | Mathers | 477/92 |
| 4,753,618 | 6/1988 | Entringer | 440/86 |
| 4,986,776 | 1/1991 | Hensel et al. | 440/87 |

*Primary Examiner*—Sherman Basinger
*Attorney, Agent, or Firm*—Knobbe, Martens, Olson & Bear LLP

[57] ABSTRACT

A marine propulsion control that permits the use of transmission braking for a watercraft without the likelihood of engine stalling by increasing engine speed during this condition. Nevertheless normal idle speeds can be maintained when running in neutral. This is accomplished with a single lever control.

11 Claims, 4 Drawing Sheets

ENGINE TRANSMISSION CONTROL FOR MARINE PROPULSION

BACKGROUND OF THE INVENTION

This invention relates to a marine propulsion system and more particularly to a combined engine and transmission control for such a propulsion system.

As is well known, watercraft, unlike motor vehicles, generally do not have a braking system. Therefore, it is a fairly common practice for the operator of a watercraft to slow the direction of travel of the watercraft by shifting into a drive mode opposite to that in the direction the watercraft is traveling. This may be done for braking from either a forward drive mode or a reverse drive mode.

Generally, watercraft employ a system for control of the engine and watercraft propulsion system referred to as a "single lever control". Such single lever controls comprise a single control lever that is connected via a motion transmitting connection or in some other way to both the speed control and the transmission of the marine propulsion system.

The operation is such that in a neutral position, the transmission is held in neutral and the engine is maintained at its idle speed. When the control lever is shifted in one direction or the other from neutral, the transmission is first moved into engagement to respective drive condition while the engine is maintained at idle. If the operator continues to move the single lever control in the same direction then the throttle is progressively opened but only after the shifting has been completed.

This is a very effective control and is very useful to the operator. However, this type of system has certain disadvantages when the transmission is utilized to brake the travel of the watercraft. That is, if the watercraft has been traveling in one direction at some substantial speed and the transmission is shifted into neutral, the watercraft will continue to move in that direction and the propeller will be rotated or driven in the same direction it was previously by the drag of the water. The engine speed will also be returned to an idle speed.

Thus, when the operator attempts to immediately engage the transmission to drive in an opposite direction to obtain a braking effect, there will be a relatively high load placed on the engine since it must overcome the drag on the propeller to reverse its direction of rotation. When operating at idle speed, this drag may be sufficient to cause stalling of the engine. This obviously is not a favorable situation.

It is, therefore, a principle object of this invention to provide an improved transmission and throttle control for a marine propulsion system.

It is a further object of this invention to provide a control for a watercraft transmission and engine wherein stalling when utilizing the transmission and engine as a brake will be prevented.

SUMMARY OF THE INVENTION

This invention is adapted to be embodied in a marine propulsion system including an engine, a propulsion device and a transmission for transmitting drive from the engine to the propulsion device. This transmission is shiftable between a forward drive condition, a neutral condition and a reverse drive condition. In accordance with the invention, control means are provided for sensing when an operator is effecting a shift from propulsion in one direction to propulsion in another and for increasing the speed of the engine upon said shift to preclude stalling.

DETAILED DESCRIPTION OF THE PREFERRED EMBODIMENTS

Figure 1:
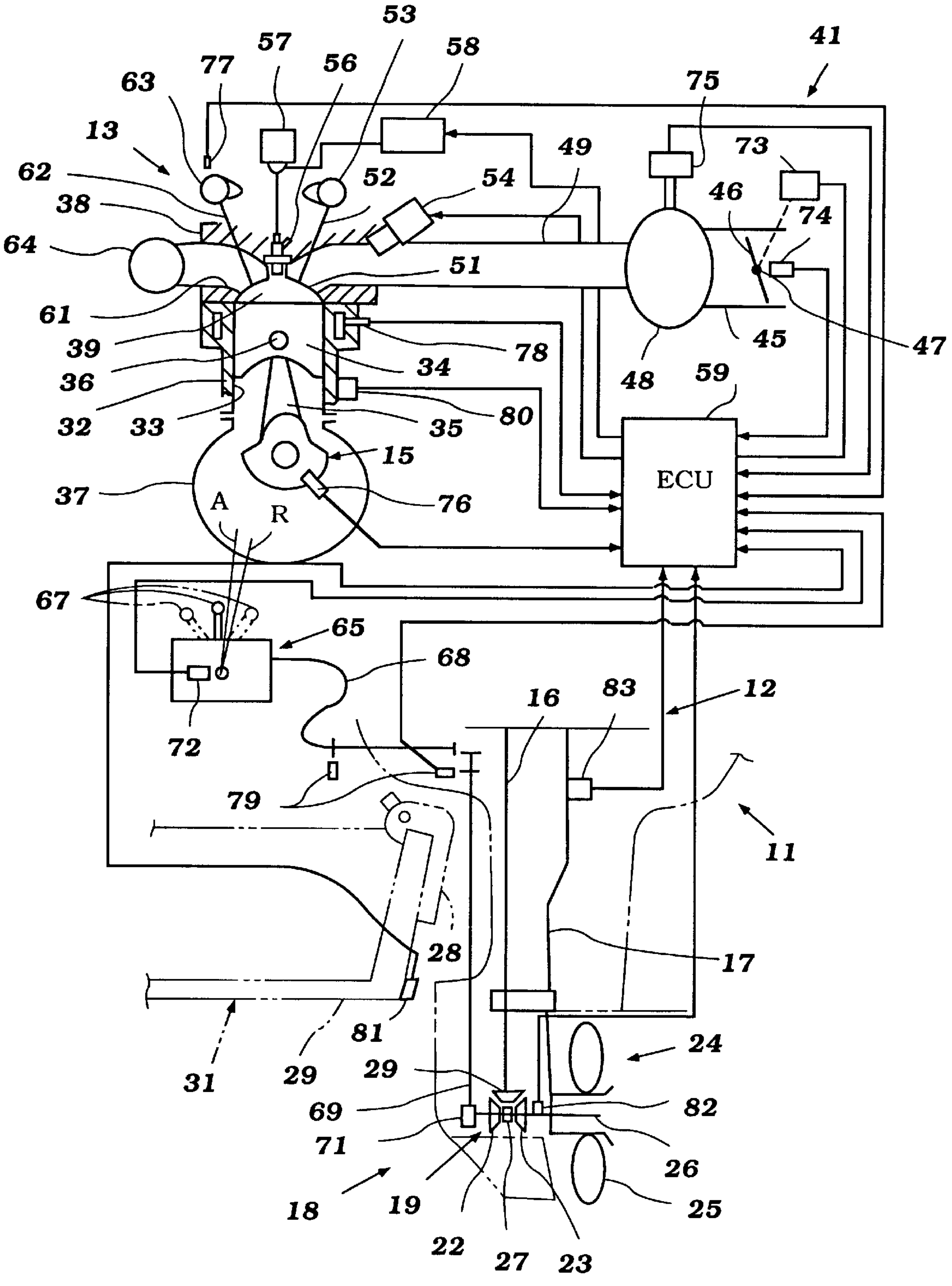
FIG. 1 is a composite view showing, in the lower portion, a marine propulsion system constructed in accordance with an embodiment of the invention and attached to the transom of a watercraft shown partially and in phantom and, in the upper portion, a partially schematic cross-sectional view of the engine and certain systems associated with it. The two view portions are linked together with the electronic control unit (ECU) for the marine propulsion system.
Figure 2:
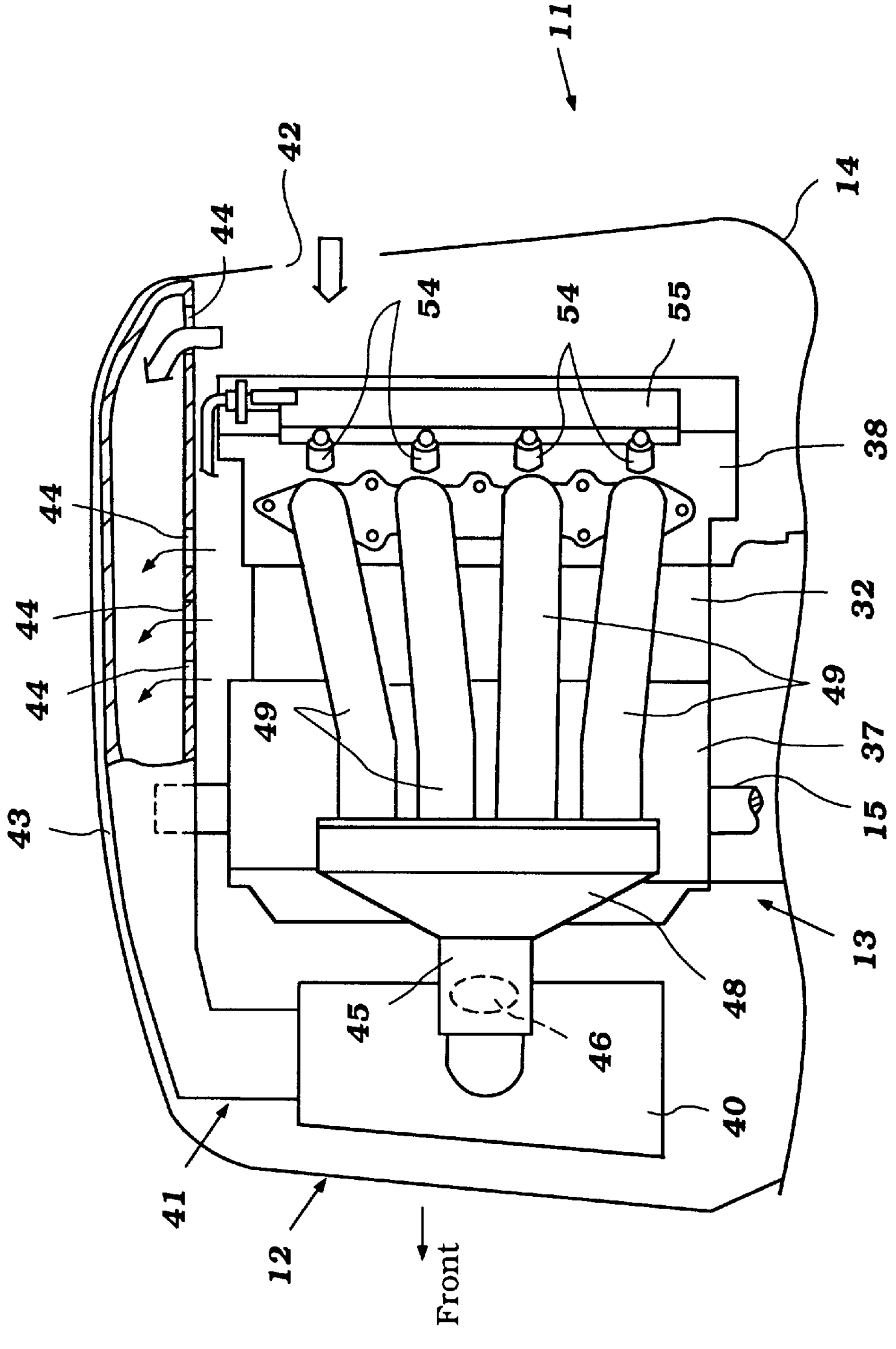
FIG. 2 is an enlarged side elevational view of the power head of the marine propulsion system, with portions of the protective cowling broken away and shown in sections so as to more clearly reveal the construction of the engine.

Referring now in detail to the drawings and initially to FIGS. 1 and 2, a marine propulsion system constructed and operated in accordance with an embodiment of the invention is indicated generally by the reference numeral 11. In the illustrated embodiment, the marine propulsion system 11 is comprised of an outboard motor. Although this form of propulsion system is illustrated and will be described, it will be readily apparent to those skilled in the art how the invention can be utilized with other types of marine propulsion systems such as inboard/outboard drives.

The outboard motor 11 is comprised of a power head, indicated generally by the reference numeral 12, and which is comprised of an internal combustion engine, indicated generally by the reference numeral 13, and a surrounding protective cowling 14. In the illustrated embodiment, the engine 13 is depicted as being of the four cylinder in-line type and operates on a four stroke principle. It will be readily apparent to those skilled in the art, however, how the invention can be utilized with a wide variety of types of engines having varying cylinder numbers and cylinder configurations and also operating on other than four stroke principles.

As is typical with outboard motor practice, the engine 13 is mounted in the power head 12 so that its crankshaft 15 rotates about a vertically extending axis. This facilitates connection to a drive shaft 16. The drive shaft 16 is journaled within a drive shaft housing 17 and depends into a lower unit 18 thereof where it drives a conventional bevel gear forward neutral reverse transmission, indicated generally by the reference numeral 19.

The reversing transmission 19 includes a driving bevel gear 21 that is affixed to the lower end of the drive shaft 16. This driving bevel gear 21 is enmeshed with a pair of diametrically opposed driven bevel gears 22 and 23. These bevel gears 22 and 23 are in constant mesh with the driving bevel gear 21. Because they are enmeshed with the gear 21 on opposite sides, they will rotate in opposite directions, as is well known in the art.

The transmission 19 is adapted to drive a propulsion device, indicated generally the reference numeral 24. In the illustrated embodiment, the propulsion device 24 is comprised of a propeller 25 which is fixed for rotation with a propeller shaft 26.

The bevel gears 22 and 23 are journaled for rotation on the propeller shaft 25 in a known manner. A dog clutching element 27 has a splined connection with the propeller shaft 26 and may be shifted into engaged condition with complimentary clutching teeth on either the gear 22 or the gear 23. In addition, there is provided a neutral condition wherein the dog clutching element 27 is engaged with neither gear 22 or 23. This condition corresponds to a neutral condition wherein the propeller shaft 26 and propeller 25 are not driven by the engine 13.

When engaged with the bevel gear 22, the propeller 25 will be driven in a forward direction. When engaged with the bevel gear 23, the dog clutching element 27 will drive the propeller shaft 26 in a reverse direction. The manner of shifting the transmission will be described shortly.

The outboard motor 11 is connected to a clamping bracket 28 that is affixed to the transom 29 of a watercraft hull 31 for propelling the watercraft through a body of water in which it is operating. This connection to the clamping bracket 28 includes an arrangement for steering of the outboard motor 11 about a vertically extending axis and for tilt and trim motion of the outboard motor 11 as is well known in the art. For this reason, this construction is not shown in detail and will not be described.

The construction of the engine 13 will now be described by principle reference to the upper portion of FIG. 1 and FIG. 2. As has been noted, the engine 13 is supported in the power head 12 so that the crankshaft 15 rotates about a vertically extending axis. Therefore, a cylinder block 32 of the engine is positioned in the power head so that its cylinder bores 33 have their axes extending horizontally. In view of the fact that the engine 13 of the four cylinder in-line type, each cylinder bore 33 is positioned vertically above the other. Pistons 34 reciprocate in the cylinder bores 33 and are connected to connecting rods 35 by piston pins 36. The lower ends of the connecting rods 35 are journaled on the crankshaft 15 in a known manner. The crankshaft 15 rotates in a crankcase chamber formed by the cylinder block 32 and a crank case member 37 which is affixed thereto.

A cylinder head 38 is affixed to the end of the cylinder block 32 opposite the crank case member 37. This cylinder head 38 has individual recesses 39 which cooperate with the heads of the pistons 34 and the cylinder bores 33 to form the individual combustion chambers of the engine 13.

A fuel air charge is delivered to the combustion chambers by an induction system, indicated generally by the reference numeral 41. This induction system 41 receives atmospheric air from within the protective cowling 14. This atmospheric air is delivered through an inlet opening 42 formed in the rearward portion of the protective cowling 14. The air then flows upwardly through a collector 43 which is formed with a plurality of downwardly facing inlet openings 44. This construction can add to the silencing and also can assist in the prevention of water from entering into the engine through its induction system.

The air from the collector 43 flows into a plenum chamber device 40 and then to a main throttle body 45. The main throttle body 45 has one or more throttle valves 46 positioned therein and rotatably journaled with a throttle valve shaft 47 for controlling the speed of the engine 13. The throttle valve 46 is operated by a system which will also be described later.

From the throttle body 45, the induction system 41 delivers air to a further plenum chamber or surge tank 48. From this tank 48, there is provided an intake manifold having individual runners 49, each of which cooperates with a respective intake passage 51 formed in the cylinder head 38 and which cooperates with a respective cylinder head recess 39 and its associated combustion chamber.

Each of the intake passages 51 terminates at a valve seat which is valved by an intake valve 52. The intake valve 52 is closed by a suitable spring arrangement and opened by an intake camshaft 53 that is rotably journaled in the cylinder head 38 in an appropriate and well known manner. The intake camshaft 53 is driven from the crankshaft 15 through a suitable timing drive at one-half crankshaft speed.

Suitable charge formers are also provided for mixing fuel with the air to form a combustible mixture in the combustion chambers. In the illustrated embodiment, a manifold fuel injection system is provided for this purpose. This includes fuel injectors 54 which are mounted in the cylinder head 38 in a known manner and which spray directly into the intake passages 51. Fuel is delivered to the fuel injectors 54 through a suitable high pressure fuel supply system which includes a fuel rail 55. Again, the particular charge forming system employed may be of any type known in the art and the described system is just typical of one of those with which the invention can be employed.

The charge which is admitted to the combustion chambers is then fired by spark plugs 56 which are mounted in the cylinder head 38. Ignition coils 57 are associated with the spark plugs 56 for providing high voltage to them to create the spark with fires the combustible charge in the combustion chambers. The ignition coils 57 are triggered by an ignition circuit 58 which is controlled by an ECU 59 in accordance with any desired ignition strategy. Other functions of the ECU 59 will be described later, as will certain control signals which are transmitted to it.

The charge which has been burned in the combustion chambers is discharged through an exhaust system which is comprised of exhaust passages 61 formed in the recesses 39 of the cylinder head 38. These exhaust passages 61 begin at exhaust ports that are valved by poppet type exhaust valves 62.

Like the intake valves 52, the exhaust valves 62 are urged to their closed positions by suitable spring arrangements. The exhaust valves 62 are opened by an exhaust camshaft 63. The exhaust camshaft 63 is rotably journaled in the cylinder head 38 in an appropriate manner. Like the intake camshaft 53, the exhaust camshaft 63 is driven at one-half crankshaft speed by a suitable drive mechanism.

The exhaust gases from the cylinder head exhaust passages 61 are collected in an exhaust manifold 64 and are discharged to the atmosphere through any suitable exhaust system. As is typical with marine practice, this exhaust system may comprise an above the water low speed exhaust gas discharge and a high speed below the water exhaust gas discharge.

The construction of the outboard motor 11 as thus far described may be considered to be conventional and, as has been previously noted in some instances, may be of any type known in the art. The invention deals primarily with the control for the transmission 19 and engine speed control which, in the illustrated embodiment, comprises the throttle valve 46. That control will now be described by initial reference primarily to FIGS. 1 and 3 and includes a single lever control mechanism, indicated generally by the reference numeral 65.

This single lever control mechanism 65 includes a housing assembly 66 in which a single lever control 67 is supported for pivotal movement about an axis. This single lever control 65 is mounted at a suitable location within the hull of the watercraft 31 where the other propulsion controls for the watercraft are located.

The control lever 67 is connected by a suitable mechanism of a type known in the art to a wire actuator 68 which is coupled, in a manner to be described shortly, to the transmission 19 for controlling its mode. The control mechanism for connecting the control lever 67 to the wire actuator 68 is such that when the lever 67 is moved from the neutral position N, as shown in solid lines in FIG. 1 and in FIG. 3, through a range, indicated as $N_r$, the wire actuator 68 will be moved in selected forward and reverse directions. The wire actuator 68 is connected to a shift rod 69 (FIG. 1) in a known manner, and operates a shift cam 71 for shifting the dog clutching element 27 in the forward and reverse positions.

This operation continues until the forward and reverse engaged positions F and R are reached. At these times, the transmission 19 will have been fully engaged in the respective drive condition. Continued movement of the control lever 67 affects no further movement of the wire actuator 68, but is employed to control the opening of the throttle valve 46 in a manner which will be described shortly.

Figure 3:
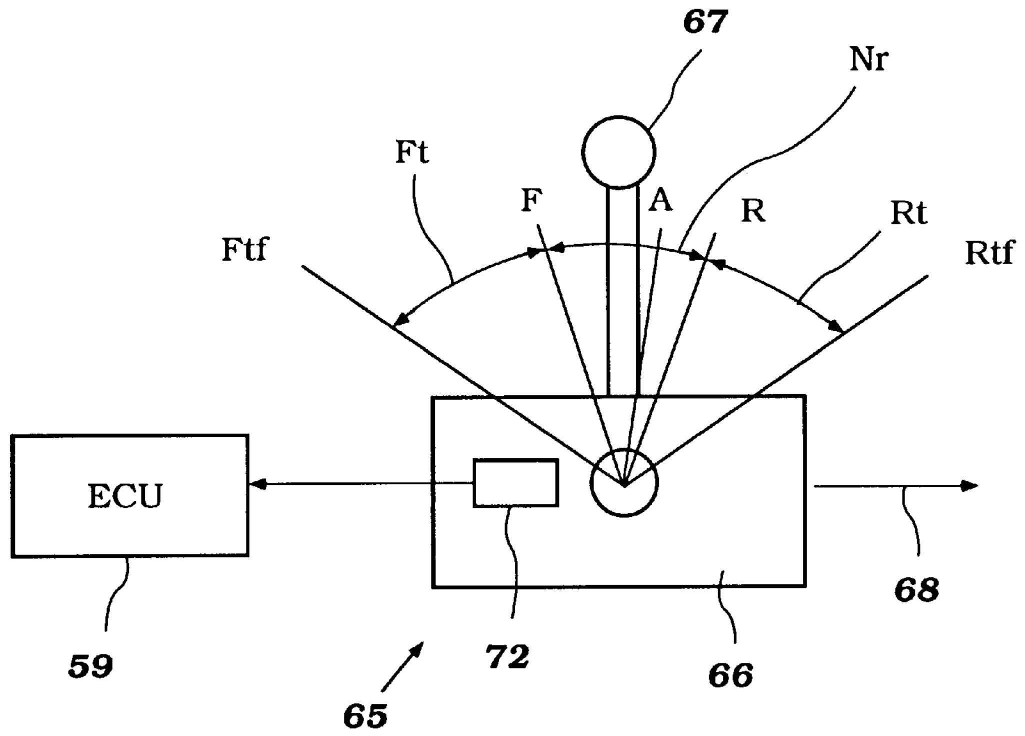
FIG. 3 is a view, in part similar to a portion of FIG. 1, on enlarged scale and showing the interrelationship between the single lever control, the electronic control unit and the marine propulsion system.
Figure 4:
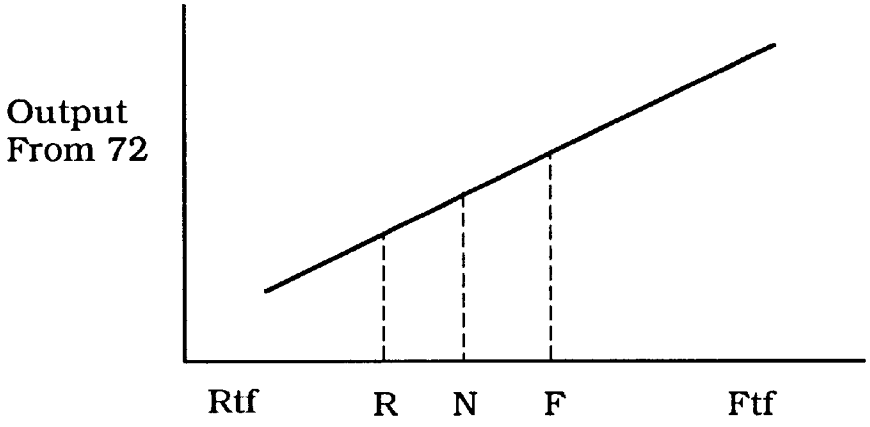
FIG. 4 is a graphical view showing the range of movement of the single lever control and the output of the sensor associated with it.

As may be best seen in FIGS. 3 and 4, the single lever control lever 67 is movable beyond both the forward and reverse engaged positions F and R through ranges indicated as Ft and Rt to full throttle positions indicated at Ftf and Rtf. The throttle valve 46 may be operated either by means of a wire actuator that permits this continued movement or, alternatively and in the preferred embodiment, through a "fly by wire" control system which will now be described by reference to FIG. 1.

A control lever position sensor 72 is associated with the single level control element 65 and outputs a signal to the ECU 59, that is indicative of the angular position of the single lever control 67. The ECU 59, therefore, outputs a control signal based upon this input position signal to a servo motor 73 which is associated with the throttle valve shaft 47 so as to position the throttle valve 46 in the position called for by the operator.

Under normal operating conditions, when moving the lever 67 through the range Nr, the throttle valve 46 will be maintained in its normal idle condition. After full engagement in either forward or reverse drive mode, and moving through the range Ft or Rt, the throttle valve 46 will be progressively opened. As is typical, the degree of opening of the throttle valve in reverse direction may be more restrictive than in forward direction. In forward direction, the throttle valve 46 can be moved to a fully opened position.

The basic control strategy for operating the throttle valve 46 and also for controlling the amount and timing of fuel injection by the injectors 54 and timing of firing of the spark plugs 56 by the ignition circuit 58 is effected by the ECU 59 using any desired control strategy. Certain sensors are employed for this conventional strategy and also for the strategy which embodies the invention and which will be described shortly. Some of the sensors are illustrated and will now be described by reference to FIG. 1.

The sensors include, in no particular order, a throttle position sensor 74 and an intake air pressure sensor 75. There is also provided a crank angle sensor 76 that provides an indication of crankshaft angle and also by comparing the angle with the time, crankshaft speed or speed of rotation of the crankshaft 15. A cylinder detector 77 is associated with one of the camshafts and in the illustrated embodiment this is the exhaust camshaft 63. The sensor 77 gives an indication to the ECU when a specific cylinder is at top dead center condition.

There is also provided an engine temperature sensor 78 which cooperates with the cooling jacket of the engine 13 for providing a signal indicative of engine operating temperature to the ECU 59. Furthermore, the position of the shift control mechanism is sensed by a sensor 79. This sensor 79 may be associated either with the shift rod 69 as shown in solid lines in FIG. 1, or with the wire actuator 68 as shown in phantom lines in this figure.

There is also provided a water speed sensor 81 that provides an output signal indicative of the speed at which the watercraft 31 is traveling.

The engine may also be provided with a vibration or knock sensor 80 so that the ECU 59 may operate to prevent knocking conditions from arising when the engine is operating. Any suitable strategy can be employed for this purpose.

There is also provided a torque detector sensor 82 that is associated with the propeller shaft 26 and which can sense the rotational torque on the propeller shaft 26.

Finally, there is provided a shifting sensor 83. This shifting sensor 83 operates to sense when the dog clutching elements are moved into engagement and thus an be utilized to provide a signal to the ECU 59 that the transmission has been shifted into engagement in either the forward or the reverse direction.

As has been previously noted, the basic control strategy for the throttle valve 46, fuel injectors 54 and spark plugs 56 can be of any known type. The normal sequence of operation of the transmission mechanism 19 and the throttle valve 46 by the movement of the control lever 67 has already been described and will not be repeated.

In accordance with the invention, however, the engine control 59 is provided with a mechanism to detect when the operator is shifting from one drive mode to the other in a manner which indicates that the operator desires to employ braking by shifting in an opposite direction from that previously traveled.

As has been discussed above, with conventional mechanisms, this shifting occurs when the throttle valve is held in its idle position and thus stalling is a distinct possibility. In accordance with the invention, the ECU 59 is operated so as to sense when the operator is effecting such a motion and when this occurs, the throttle valve 46 will be opened beyond its normal idle position. This is done in such a way, however, that when operating in neutral under normal conditions, the engine idle speed will be maintained at idle.

Figure 5:
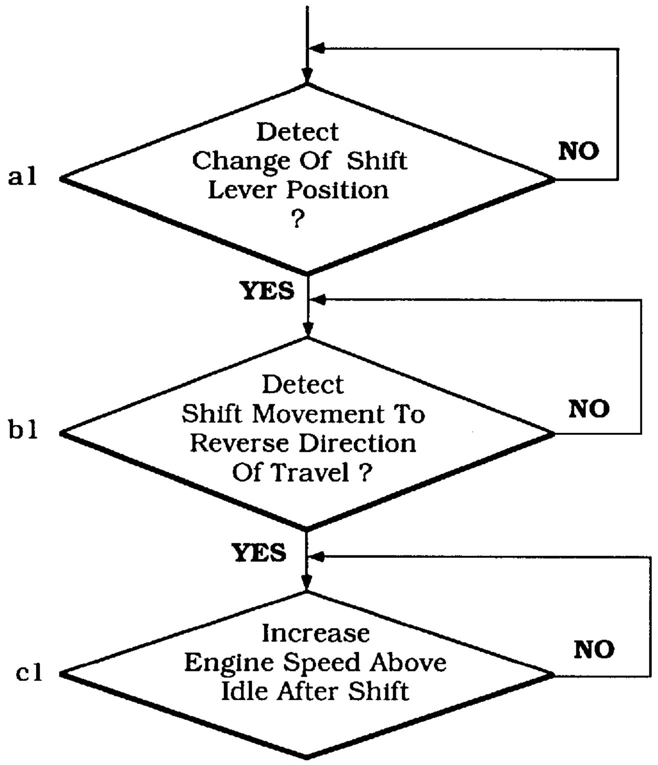
FIG. 5 is a block diagram showing one embodiment of control routine.

The first of these control routines is shown in FIG. 5, and this is effective to increase the engine idle speed immediately after the actual shift into the new gear is made. In accordance with this control routine, at the step a1, the position of the single lever control lever 67 is read to assemble information. If there is no shift in position, the program merely repeats.

If, however, it is detected that the operator is effecting a change in transmission condition, for example, by shifting from a forward drive position through the neutral position to a first position indicated at "a" in FIGS. 1 and 3, then at step b2 it is determined that there is a shift in position from one drive mode toward another drive mode.

Then, the program operates so as to output a signal at a point "b" which is after the actual engagement of the reverse engagement position "r" and then the engine speed is increased above idle at the step c1. Thus after the actual shift occurs, the engine speed is immediately increased to prevent stalling.

If at the step b2, the shift lever is not moved to the position "a", then the program merely repeats and the normal idle speed will be maintained. Thus, with this embodiment, normal engine idle speed is maintained unless a shift toward an opposite drive condition occurs within a predetermined time after the transmission is shifted out of one of its drive modes.

The sensing of the shift to a reversed drive condition may also be determined by the existence of a torque signal from the sensor 82. If there is a torque signal present it may be assumed that the operator is effecting a shift at the time the watercraft 31 is in motion and this is driving the propeller 25 even though no power is being transmitted.

Also, the embodiment illustrates shifting from forward to reverse, but the same effect can be accomplished in the opposite direction.

Figure 6:
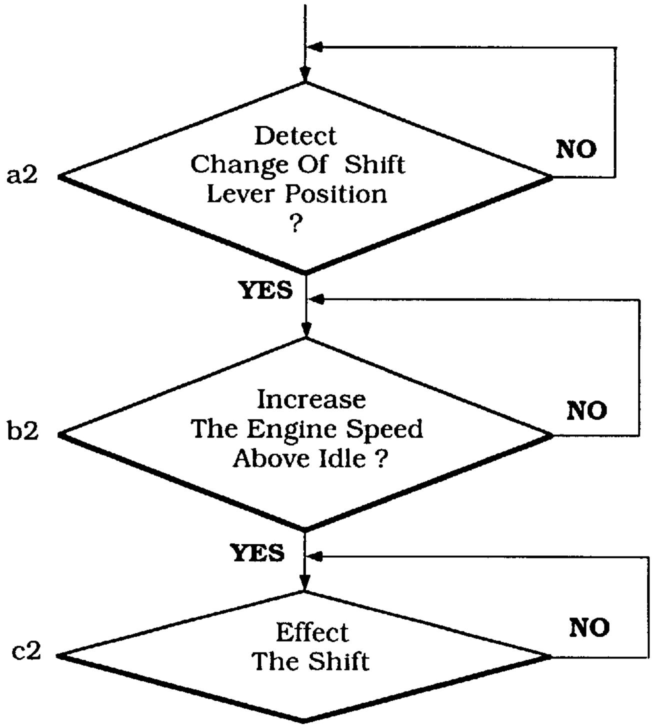
FIG. 6 is a block diagram, in part similar to FIG. 5, and shows another embodiment of control routine.

Another mode of operation is illustrated in FIG. 6, and in this mode, the engine speed is increased above idling before the actual shift has been accomplished. Thus, this program begins at the step a2 wherein it is detected if the single lever control 67 has been moved from one of its drive modes to the neutral position in the same manner as in step a1.

However, with this embodiment, at the step b2 the engine speed is immediately increased above idle. Then, the program at the step c2 the shift occurs. Thus the engine will be at a higher speed at this time and stalling will not occur.

From the foregoing description, it should be readily apparent to those skilled in the art that the described embodiments provide a marine propulsion control that permits the use of transmission braking for a watercraft without the likelihood of engine stalling while still retaining normal idle speeds when running in neutral. This can be accomplished with a single lever control.

Of course, the foregoing description is that of preferred embodiments of the invention and various changes and modifications may be made without departing from the spirit and scope of the invention, as defined by the appended claims.

What is claimed is:

1. A marine propulsion system including an engine, a propulsion device, a bevel gear reversing transmission for transmitting drive from said engine to said propulsion device, said transmission including a dog clutching element being shiftable between a forward drive condition, a neutral condition and a reverse drive condition, a transmission and engine seed control comprising a manual control mechanically connected to said dog clutching element for shifting said dog clutching element between said conditions in response to a manual force input to said manual control for moving said manual control between a neutral range in which said dog clutching element is not driving said propulsion device, a drive range in which said dog clutching element is driving said propulsion device and an accelerating position wherein Said dog clutching element is maintained in the condition driving said propulsion device and the speed of said engine is progressively increased, and control means for sensing an operator demand condition when an operator is operating said manual control for effecting a shift in said transmission dog clutching element from propulsion in one direction to propulsion in another direction and for increasing the speed of said engine beyond that called for by the position of said manual control upon the sensing of said operator demand condition to preclude stalling.

2. A marine propulsion system as set forth in claim 1 wherein the engine speed is increased before the transmission is shifted into the new drive condition.

3. A marine propulsion system as set forth in claim 1 wherein the engine speed is increased immediately after the transmission is shifted into the new drive condition.

4. A marine propulsion system as set forth in claim 1 wherein the manual control comprises an operating lever and the change in transmission drive condition is sensed by sensing the position of said operating lever.

5. A marine propulsion system as set forth in claim 4 wherein change in position of the operating lever is sensed.

6. A marine propulsion system as set forth in claim 4 wherein the operating lever is moveable through a neutral range wherein the engine speed is normally held at idle and the transmission condition is maintained in neutral in a first direction to a first position where the transmission is shifted into a forward drive condition while the engine speed is still normally maintained at idle and in an opposite direction to a second position where said transmission is shifted into a reverse drive condition while the engine speed is still normally maintained at idle, said operating lever being moveable beyond said first and said second positions in the respective directions and further including means for increasing the engine speed above idle upon said further movement beyond each of said first and second positions while maintaining said transmission in the respective drive condition.

7. A marine propulsion system as set forth in claim 6 wherein the control causes the engine speed to be increased before the transmission is shifted into the new drive condition.

8. A marine propulsion system as set forth in claim 6 wherein the control causes the engine speed to be increased immediately after the transmission is shifted into the new drive condition.

9. A marine propulsion system as set forth in claim 6 wherein change in position of the operating lever is sensed.

10. A marine propulsion system as set forth in claim 9 wherein the control causes the engine speed to be increased before the transmission is shifted into the new drive condition.

11. A marine propulsion system as set forth in claim 9 wherein the control causes the engine speed to be increased immediately after the transmission is shifted into the new drive condition.

* * * * *

UNITED STATES PATENT AND TRADEMARK OFFICE
CERTIFICATE OF CORRECTION

PATENT NO : 6102755

DATED : August 15, 2000

INVENTOR(S) : Akihiko Hoshiba

It is certified that error appears in the above-identified patent and that said Letters Patent is hereby corrected as shown below:

Column 7, Claim 1, line 50, delete "seed" and insert --speed--.

Column 8, Claim 1, line 1, delete "Said" and insert --said--.

Signed and Sealed this

Twenty-second Day of May, 2001

*Attest:*

Nicholas P. Godici

NICHOLAS P. GODICI

*Attesting Officer*

*Acting Director of the United States Patent and Trademark Office*